United States Patent
Yamamoto et al.

(10) Patent No.: US 12,379,710 B2
(45) Date of Patent: Aug. 5, 2025

(54) CONTROL DEVICE FOR MACHINE TOOL

(71) Applicant: FANUC CORPORATION, Yamanashi (JP)

(72) Inventors: Kenta Yamamoto, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 411 days.

(21) Appl. No.: 17/904,676

(22) PCT Filed: Feb. 17, 2021

(86) PCT No.: PCT/JP2021/005983
§ 371 (c)(1),
(2) Date: Aug. 19, 2022

(87) PCT Pub. No.: WO2021/166974
PCT Pub. Date: Aug. 26, 2021

(65) Prior Publication Data
US 2023/0069907 A1    Mar. 9, 2023

(30) Foreign Application Priority Data
Feb. 19, 2020    (JP) ................................ 2020-025891

(51) Int. Cl.
G05B 19/4093    (2006.01)
(52) U.S. Cl.
CPC ............... G05B 19/40938 (2013.01); *G05B 2219/39195* (2013.01)
(58) Field of Classification Search
CPC ............................................. G05B 19/40938
(Continued)

(56) References Cited

U.S. PATENT DOCUMENTS

2017/0102685 A1*  4/2017  Kitakaze ................. B23B 25/02
2017/0285608 A1* 10/2017  Sonoda ................ G05B 19/416
(Continued)

FOREIGN PATENT DOCUMENTS

JP    H02-131839 A    5/1990
JP    5781241 B1    9/2015
(Continued)

OTHER PUBLICATIONS

International Search Report issued in PCT/JP2021/005983; mailed Apr. 27, 2021.

*Primary Examiner* — Mohammad Ali
*Assistant Examiner* — Joshua T Sanders
(74) *Attorney, Agent, or Firm* — Studebaker Brackett PLLC

(57) ABSTRACT

The purpose of the present invention is to provide a control device for a machine tool that can reliably chop chips while suppressing vibration of the machine tool. A control device (1) for a machine tool machines by relatively oscillating a tool and a workpiece, the control device comprising: an oscillation command generation unit (13) that calculates an oscillation amplitude and an oscillation frequency from a machining condition and generates an oscillation command; and a position-speed control unit (17) that relatively oscillates the tool and the workpiece on the basis of a superimposed command generated by superimposing the oscillation command generated by the oscillation command generation unit (13) on a position command or a position deviation. The oscillation command generation unit (13) changes the oscillation amplitude and/or the oscillation frequency during machining.

10 Claims, 4 Drawing Sheets

(58) Field of Classification Search
USPC .......................................................... 700/197
See application file for complete search history.

(56) References Cited

U.S. PATENT DOCUMENTS

| | | | |
|---|---|---|---|
| 2018/0210417 A1* | 7/2018 | Okita | G05B 19/402 |
| 2018/0239328 A1* | 8/2018 | Oikawa | G05B 19/416 |
| 2020/0016712 A1* | 1/2020 | Yamamoto | B23Q 15/225 |

FOREIGN PATENT DOCUMENTS

| | | |
|---|---|---|
| JP | 2017-056515 A | 3/2017 |
| JP | 2017-182336 A | 10/2017 |
| JP | 2020-009248 A | 1/2020 |
| WO | 2015/146946 A1 | 10/2015 |

\* cited by examiner

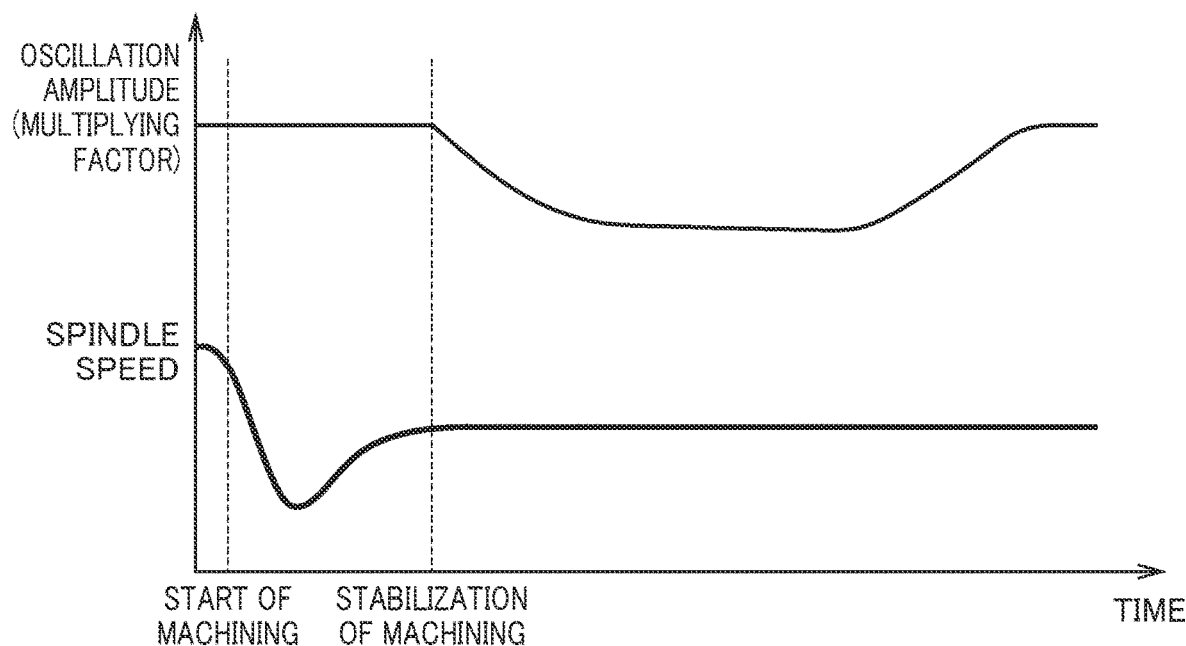
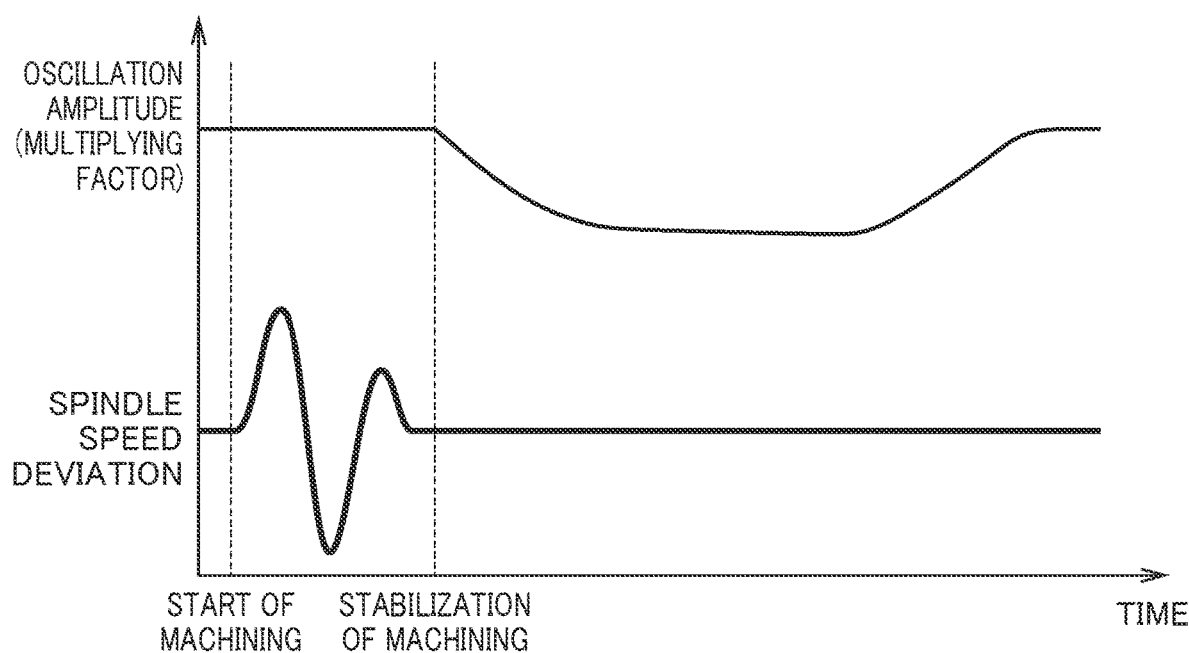

CONTROL DEVICE FOR MACHINE TOOL

TECHNICAL FIELD

The present disclosure relates to a machine tool controller for a machine tool.

BACKGROUND ART

Conventionally, oscillation cutting has been employed in some cases because a load tends to fluctuate and it is difficult to shred chips with a breaker at the beginning of cutting in a drilling process and a turning process. For example, Patent Document 1 discloses a technique according to which a cutting process is performed while causing a cutting tool and a workpiece to oscillate relative to each other, thereby making it possible to shred chips.

Patent Document 1: Japanese Unexamined Patent Application, Publication No. 2017-56515

DISCLOSURE OF THE INVENTION

Problems to be Solved by the Invention

However, while it is necessary to increase an oscillation amplitude in order to reliably shred chips at the beginning of cutting, strong vibration is caused in a machine tool when machining is continued with the oscillation amplitude as it is even after the machining is stabilized. Vibration of the machine tool adversely affects machining accuracy, and thus constitutes an important technical problem to be solved.

Therefore, it is desired for a machine tool controller for a machine tool that performs machining while causing a tool and a workpiece to oscillate relative to each other to be capable of reliably shredding chips while preventing or reducing vibration of the machine tool.

Means for Solving the Problems

An aspect of the present disclosure is directed to a machine tool controller for, a machine tool that performs machining while causing a tool and a workpiece to oscillate relative to each other. The machine tool controller includes: an oscillation command generation unit that calculates an oscillation amplitude and an oscillation frequency from a machining condition and generates an oscillation command; and a control unit that causes the tool and the workpiece to oscillate relative to each other based on a superimposition command generated by superimposition of the oscillation command generated by the oscillation command generation unit on a position command or a position deviation. The oscillation command generation unit changes at least one of the oscillation amplitude or the oscillation frequency during the machining.

Effects of the Invention

According to the present disclosure, it is possible to provide a machine tool controller capable of reliably shredding chips while preventing or reducing vibration of the machine tool during machining by changing an oscillation condition (oscillation amplitude, oscillation frequency) according to the machining.

BRIEF DESCRIPTION OF THE DRAWINGS

FIG. 4 is a diagram showing a change in the oscillation condition in a drilling process of Example 3;

FIG. 5 is a diagram showing a change in the oscillation condition in a drilling process of Example 4;

PREFERRED MODE FOR CARRYING OUT THE INVENTION

An embodiment of the present disclosure will be described in detail below with reference to the drawings.

Figure 1:
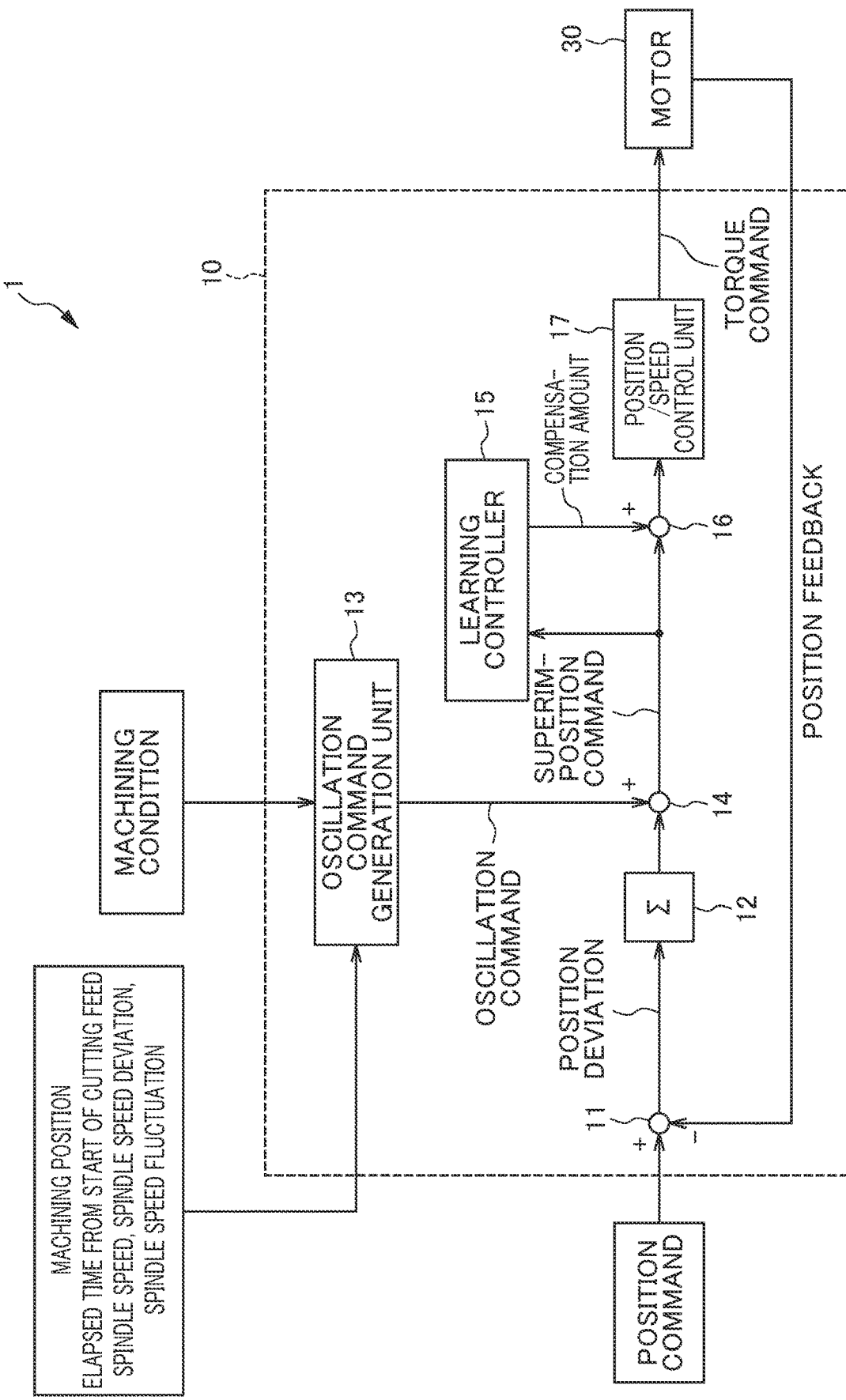
FIG. 1 is a functional block diagram of a machine tool controller according to as embodiment of the present disclosure.

FIG. 1 is a functional block diagram of a machine tool controller 1 according to an embodiment of the present disclosure. As shown in FIG. 1, the machine tool controller 1 according to the present embodiment includes a servo controller 10, and controls driving of a motor 30 that drives a feed shaft.

As shown in FIG. 1, the machine tool controller according to the present embodiment includes an adder 11, an integrator 12, an oscillation command generation unit 13, an adder 14, a learning controller 15, an adder 16, and a position/speed control unit 17.

The machine tool controller 1 according to the present embodiment generates a drive command of the motor 30 from a machining program. The generated drive command (position command) is input to the adder 11 of the servo controller 10 to be described later as shown in FIG. 1.

Further, the machining program of the machine tool controller 1 according to the present embodiment is created in a manner that tool information and tool operation information are set by a. CAM system (not shown) for a machining shape created by a CAD system (not shown), for example.

The adder 11 calculates a position deviation. Specifically, the adder 11 calculates a position deviation, which is a difference between a position feedback based on position detection by an encoder provided in the motor 30 of the feed shaft and a position command.

The integrator 12 calculates an integrated value of the position deviation. Specifically, the integrator 12 calculates the integrated value of the position deviation by integrating the position deviation calculated by the adder 11.

The oscillation command generation unit 13 calculates an oscillation amplitude and an oscillation frequency from machining conditions, and generates an oscillation command. In other words, the oscillation command generation unit 13 calculates an oscillation condition including the oscillation amplitude and the oscillation frequency from the machining conditions, and generates an oscillation command based on the calculated oscillation condition.

Further, the oscillation command generation unit 13 of the present embodiment is characterized by changing at least one of the oscillation amplitude or the oscillation frequency constituting the oscillation condition during machining. Here, when an oscillation amplitude multiplying factor is denoted by K and a feed rate is denoted by F (rarn/rotation), an oscillation amplitude K' (rem) is represented by K'=F×K, and similarly when an oscillation frequency multiplying factor is denoted by I and spindle rpm is denoted by S (minute), an oscillation frequency I' (Hz) is represented by I'=S/60×I. For this reason, the change of the oscillation amplitude and the oscillation frequency in the present embodiment also includes a change of the oscillation amplitude multiplying factor and the oscillation frequency multiplying factor.

In the present embodiment as described above, by the change to the oscillation condition according to the machining during machining, it is possible to reliably shred chips while preventing or reducing vibration of the machine tool. It should be noted that the machining in the present embodiment includes not only cutting after the start of cutting but also cutting feed before cutting. Further, the change of the oscillation condition includes, for example, continuously changing the oscillation condition and stopping the oscillation operation in the middle, that is, setting the oscillation amplitude to zero.

More specifically, the oscillation command generation unit 13 of the present embodiment changes at least one of the oscillation amplitude or the oscillation frequency based on a machining position, an elapsed time from the start of cutting feed, or an amount of movement in a machining direction. For example, the change of the oscillation condition may be started immediately after a predetermined machining position, a predetermined elapsed time from the start of cutting feed, or a predetermined amount of movement in the machining direction is reached, or the change of the oscillation condition may be started after a lapse of a predetermined time. Further, for example, the oscillation condition may be changed corresponding to a change of each of the machining position, the elapsed time from the start of cutting feed, or the amount of movement in the machining direction.

Alternatively, the oscillation command generation unit 13 of the present embodiment changes at least one of the oscillation amplitude or the oscillation frequency, based on at least one of a spindle load, a spindle speed, a spindle speed deviation, a spindle speed fluctuation, a feed shaft load, a feed shaft speed, a feed shaft speed deviation, or a feed shaft speed fluctuation. For example, the change of the oscillation condition may be started immediately after a predetermined spindle load, a predetermined spindle speed, a predetermined spindle speed deviation, a predetermined spindle speed fluctuation, a predetermined feed shaft load, a predetermined feed shaft speed, a predetermined feed shaft speed deviation, and a predetermined feed shaft speed fluctuation are reached, or the change of the oscillation condition may be started after a lapse of a predetermined time. Further, for example, the oscillation condition may be changed corresponding to a change of each of the spindle load, the spindle speed, the spindle speed deviation, the spindle speed fluctuation, the feed shaft load, the feed shaft speed, the feed shaft speed deviation, and the feed shaft speed fluctuation.

As a specific method of changing the oscillation condition, the oscillation condition may be changed with a time constant, or the oscillation condition may be changed by being switched at a specific oscillation phase, for example, step by step. Examples of the specific oscillation phase may be 0° and 90°. Further, the oscillation command generation unit 13 may change at least one of the oscillation amplitude or the oscillation frequency to a smaller value, or may change it to a larger value, conversely. Since there are various modes regarding the change of the oscillation condition during machining by the oscillation command generation unit 13, a specific example will be described in detail below.

The adder 14 generates a superimposition command. Specifically, the adder 14 generates a superimposition command by superimposing the oscillation command generated by the oscillation command generation unit 13 on an integrated value of the position deviation calculated by the integrator 12. The adder 14 may be configured to add the oscillation command generated by the oscillation command generation unit 13 to the position command.

The learning controller 15 calculates a compensation amount of the superimposition command based on the position deviation, and compensates the superimposition command by allowing the adder 16 to add the calculated compensation amount to the superimposition command. The learning controller 15 includes a memory, stores a deviation between an ideal position and an actual position of the motor 30 that can define a certain cycle in the memory, and reads the deviation stored in the memory for each cycle, thereby calculating the compensation amount for making the deviation close to 0. The superimposition command of the present embodiment tends to cause a position deviation due to the inclusion of the oscillation command, but followability to the cyclical oscillation command is improved due to the compensation by the learning controller 15.

The position/speed control unit 17 generates a torque command for the motor 30, which drives the feed shaft, based on the superimposition command, and controls the motor 30 with the generated torque command. Thus, machining is performed while the tool and the workpiece oscillate relative to each other.

Next, a description will be given in detail with reference to FIGS. 2 to 7 with respect to specific examples of the change of the oscillation condition during machining by the oscillation command generation unit 13. In each Example shown in FIGS. 2 to 7, an example of changing the oscillation amplitude (including the oscillation amplitude multiplying factor) or the oscillation frequency (including the oscillation frequency multiplying factor) is shown, but the oscillation frequency may be changed instead of the oscillation amplitude, or the oscillation amplitude may be changed instead of the oscillation frequency. Alternatively, both the oscillation amplitude and the oscillation frequency may be changed. In each Example, the oscillation condition may be changed with a time constant, or may be switched stepwise.

Further, in each Example to be described later, if the chips can be shredded, the chips can be made small up to the oscillation amplitude that does not cause air cut. (idle swing) and does not recede. Further, the oscillation operation may be stopped in the middle (that is, the oscillation amplitude is set to zero), and the chip breaker may be used to shred the chips. Practically, the oscillation amplitude and the oscillation frequency are reduced as the machining progresses, but the oscillation amplitude and the oscillation frequency can be increased without being limited thereto.

Figure 2:
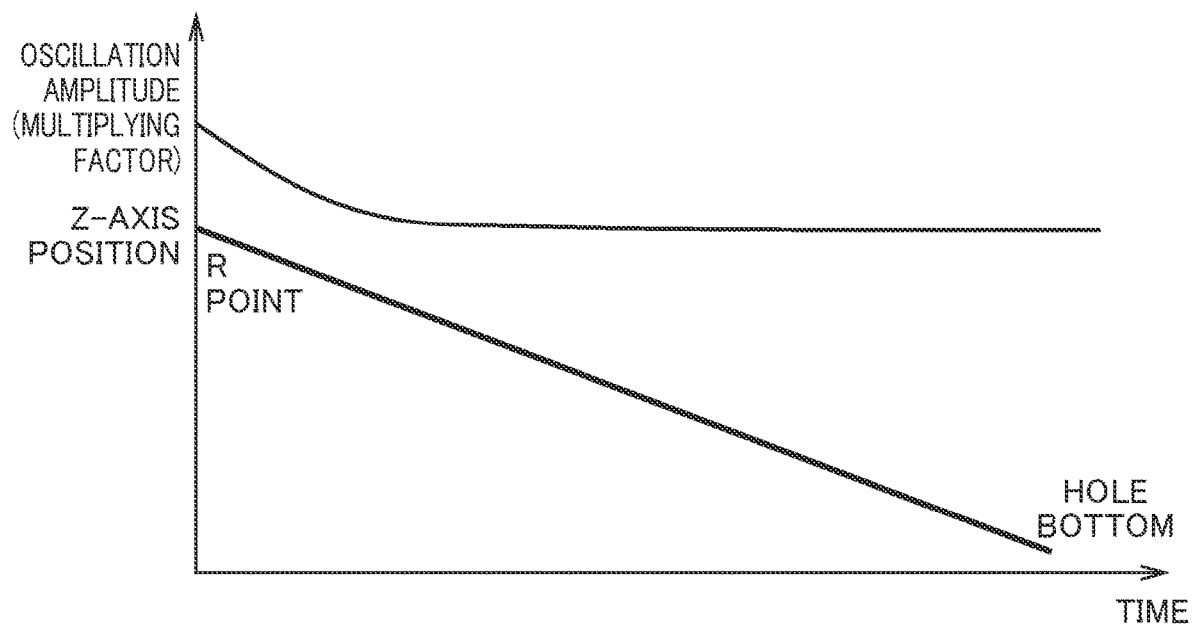
FIG. 2 is a diagram showing a change in an oscillation condition in a drilling process of Example 1.

FIG. 2 is a diagram showing a change in the oscillation condition in a drilling process of Example 1, Example 1 is an example in which the present embodiment is applied to a drilling process, and is an example in which the oscillation amplitude is changed based on a machining position. As a machining position, a Z-axis position, that is, an amount of movement from an R point, which is a reference position of the Z-axis, is used. However, the oscillation amplitude may be changed based on the elapsed time from the start of cutting feed and the amount of movement in the machining direction instead of the machining position.

In Example 1 as shown in FIG. 2, the oscillation amplitude is changed to a smaller value up to a predetermined distance in a direction away from the R point in the course where the Z-axis position moves from the R point toward a hole bottom. This makes it possible to shred chips while preventing or reducing vibration of the machine tool. At this time, the oscillation amplitude is changed with a time constant such that a shock does not occur due to the change of the oscillation amplitude during the machining. For this reason, since the oscillation amplitude changes gently and gradually, the shock due to a sudden change in the oscillation amplitude can be reduced, and machining accuracy can be improved.

Further, as Modification Example of this Example, the oscillation condition may be changed at a specific oscillation phase. Specifically, for example, the oscillation amplitude may be switched and changed when the oscillation phase is 0° or 90°. This also makes it possible to reduce the shock due to a sudden change in the oscillation amplitude and improve machining accuracy.

Figure 3:
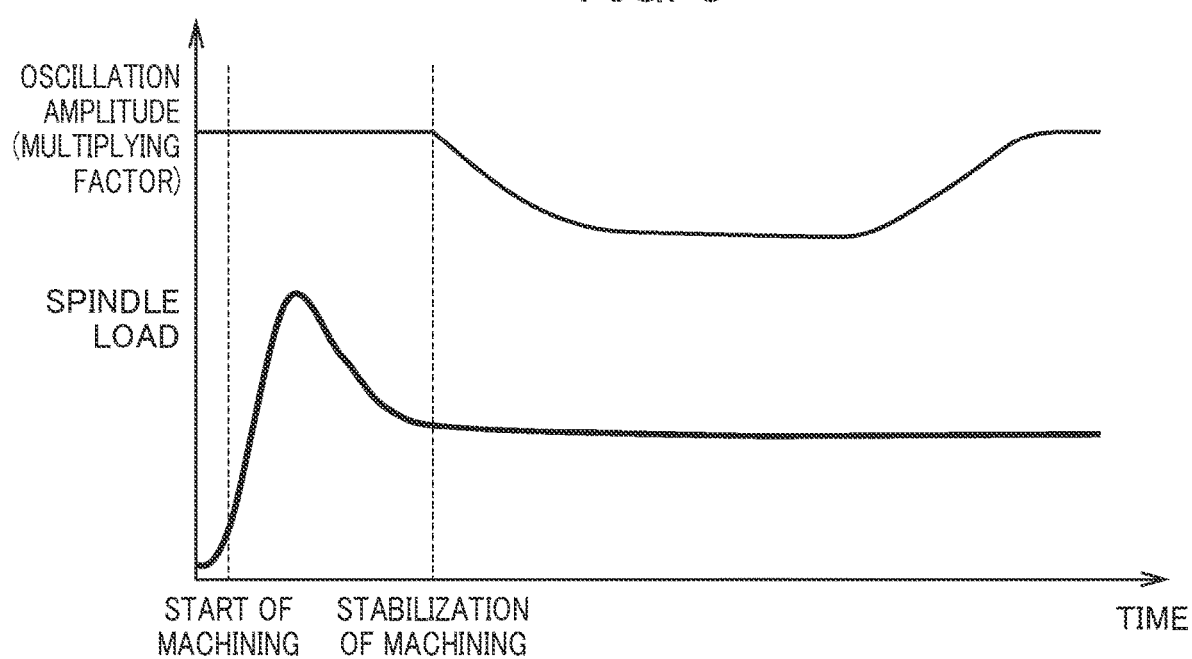
FIG. 3 is a diagram showing a change in the oscillation condition in a drilling process of Example 2.

FIG. 3 is a diagram showing a change in the oscillation condition in a drilling process of Example 2. Example 2 is an example in which the present embodiment is applied to a drilling process, and is an example in which the oscillation amplitude is changed based on a spindle load. As shown in FIG. 3, when machining is started, a spindle load rapidly increases to reach a peak, and then gradually decreases and converges to a predetermined value. Since it is determined that the machining has entered a stable state when the spindle load has converged to the predetermined value, the oscillation amplitude is changed with a time constant at this time. Thereby, the same effect as in Example 1 can be obtained. Further, as in Example 2, the oscillation amplitude is changed to a smaller value once and then is changed to a larger value after a lapse of a predetermined time.

As Modification Example of this Example, the oscillation condition may be changed based on a spindle speed or a spindle speed deviation instead of the spindle load, or the oscillation condition may be changed based on a spindle speed fluctuation. Alternatively, the oscillation condition may be changed based on at least one of a feed shaft load, a feed shaft speed, a feed shaft speed deviation, or a feed shaft speed fluctuation.

FIG. 4 is a diagram showing a change in the oscillation condition in a drilling process of Example 3. Example 3 is an example in which the present embodiment is applied to a drilling process, and is an example in which the oscillation amplitude is changed based on a spindle speed. As shown in FIG. 4, when machining is started, a spindle speed decreases once, then gradually increases and converges to a predetermined value. Since it determined that the machining has entered a stable state when the spindle speed has converged to the predetermined value, the oscillation amplitude is changed with a time constant at this time. Thereby, the same effect as Examples 1 and 2 can be obtained.

FIG. 5 is a diagram showing a change in the oscillation condition in a drilling process of Example 4. Example 4 is an example in which the present embodiment is applied to a drilling process, and is an example in which an oscillation amplitude is changed based on a spindle speed deviation. As shown in FIG. 5, when machining is started, a spindle speed deviation repeatedly increases and decreases to become unstable, and then converges to an original predetermined value. Since it is determined that the machining has entered a stable state when the spindle speed deviation has converged to the predetermined value, the oscillation amplitude is changed with a time constant at this time. Thereby, the same effect as in Examples 1 and 3 can be obtained.

Figure 6:
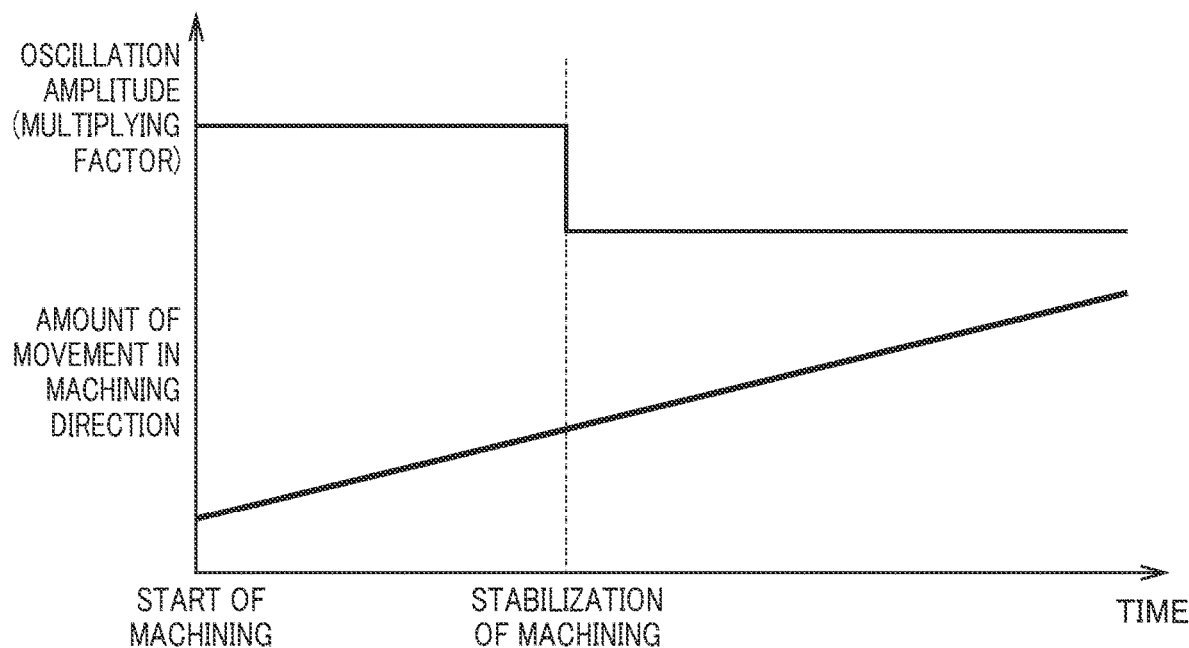
FIG. 6 is a diagram showing a change in the oscillation condition is a turning process of Example 5.

FIG. 6 is a diagram showing a change in the oscillation condition in a turning process of Example 5. Example 5 is an example in which the present embodiment is applied to a turning process, and is an example in which an oscillation amplitude is changed based on an amount of movement in the machining direction. As shown in FIG. 6, when machining is started, the amount of movement in the machining direction increases with the lapse of time, and the oscillation amplitude is switched to a smaller value when the machining enters a stable state after a lapse of a predetermined time from the start of machining. Thereby, it is possible to shred chips while preventing or reducing vibration of the machine tool.

Figure 7:
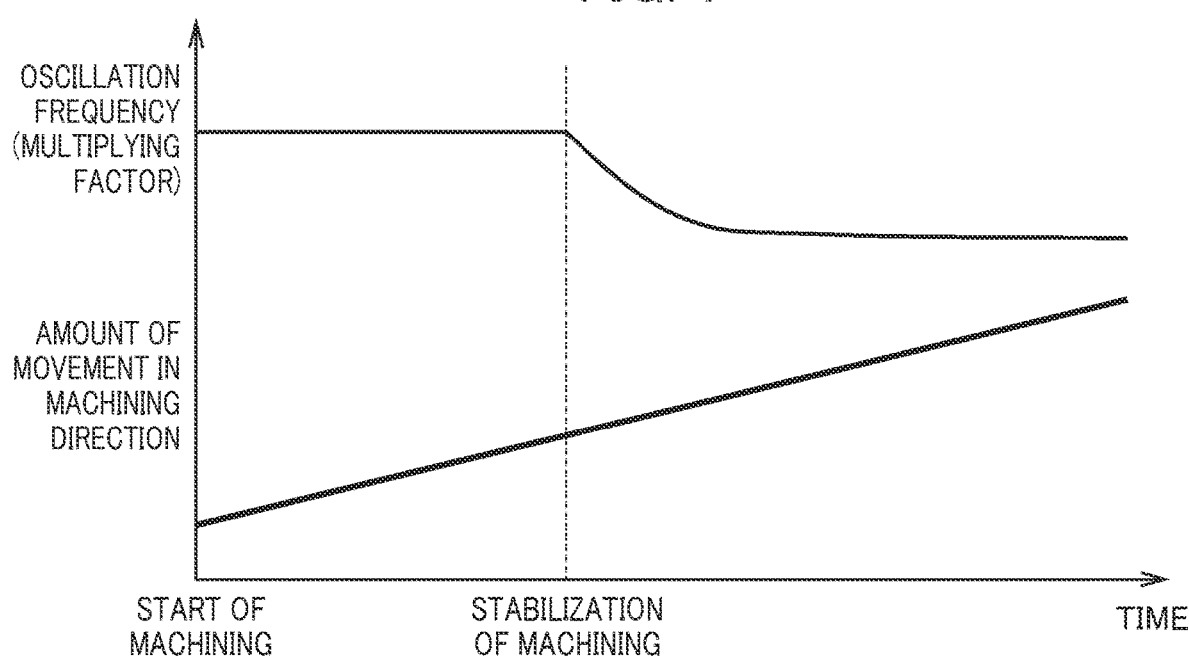
FIG. 7 is a diagram showing a change in the oscillation condition in a turning process of Example 6.

FIG. 7 is a diagram showing a change in the oscillation condition in a turning process of Example 6. Example 6 is an example in which the present embodiment is applied to a turning process, and is an example in which an oscillation frequency is changed based on an amount of movement in the machining direction. As shown in FIG. 7, when machining is started, the amount of movement in the machining direction increases with the lapse of time, and the oscillation frequency is changed with a time constant when the machining enters a stable state after a lapse of a predetermined time from the start of machining. Thereby, it is possible to shred chips while preventing or reducing vibration of the machine tool. Further, it is possible to reduce the shock due to a sudden change in the oscillation frequency and improve machining accuracy.

According to the present embodiment, the following effects are achieved. According to the present embodiment, the machine tool controller includes: the oscillation command. Generation unit 13 that calculates the oscillation amplitude and the oscillation frequency from the machining condition and generates the oscillation command; and the position/speed control unit 17 that causes the tool and the workpiece to oscillate relative to each other based on the superimposition command generated by superimposition of the oscillation command generated by the oscillation command generation unit 13 on the position command or the position deviation, and the oscillation command generation unit 13 is configured to change at least one of the oscillation amplitude or the oscillation frequency during machining. Conventionally, since the load is large at the beginning of cutting, the oscillation amplitude is set to be large in order to reliably shred chips and thus vibration occurs in the machine tool, but according to the above configuration, vibration of the machine tool can be reduced or prevented by changing the oscillation amplitude and the like to an appropriate value during the machining. Therefore, according to such a constitution, it is possible to shred chips while preventing or reducing the vibration of the machine tool, and thus machining accuracy can be improved.

In the present embodiment, the oscillation command generation unit 13 is configured to change at least one of the oscillation amplitude or the oscillation frequency based on the machining position, the elapsed time from the start of cutting feed, and the amount of movement in the machining direction. According to such a constitution, the oscillation condition is changed based on the machining position, the elapsed time from the start of cutting feed, or the amount of movement in the machining direction, whereby the oscillation condition can be changed after the machining becomes stable, and the oscillation condition can be changed at a further appropriate timing.

In the present embodiment, the oscillation command generation unit 13 is configured to change at least one of the oscillation amplitude or the oscillation frequency based on at least one of the spindle load, the spindle speed, the spindle speed deviation, the spindle speed fluctuation, the feed shaft load, the feed shaft speed, the feed shaft speed deviation, or the feed shaft speed fluctuation. According to such a constitution, the oscillation condition is changed based on at least one of the spindle load, the spindle speed, the spindle speed deviation, the spindle speed fluctuation, the feed shaft load, the feed shaft speed, the feed shaft speed deviation, or the feed shaft speed fluctuation, whereby the oscillation condition can be changed after the machining becomes stable, and the oscillation condition can be changed at a further appropriate timing.

In the present embodiment, the oscillation command generation unit 13 is configured to change at least one of the oscillation amplitude or the oscillation frequency with a time constant. According to such a constitution, the oscillation condition is changed with the time constant, whereby it is possible to reduce the shock due to a change in the oscillation condition and improve machining accuracy.

In the present embodiment, the oscillation command generation unit 13 is configured to change at least one of the oscillation amplitude or the oscillation frequency at a specific oscillation phase. According to such a constitution, the oscillation condition is changed at the specific oscillation phase, for example, at an oscillation phase of 0° or 90°, thereby making it possible to reduce the shock due to a change in the oscillation condition and improve machining accuracy.

In the present embodiment, the oscillation command generation unit 13 is configured to change at least one of the oscillation amplitude or the oscillation frequency to a smaller value. Conventionally, since the load is large at the beginning of cutting, the oscillation amplitude is set to be large in order to reliably shred chips and thus vibration occurs in the machine tool, but according to the above constitution, vibration of the machine tool can be more reliably prevented or reduced by changing the oscillation amplitude and the like to a small value during the machining. Therefore, it is possible to shred chips while preventing or reducing the vibration of the machine tool more reliably, and thus machining accuracy can be improved.

In the present embodiment, the machine tool controller further includes the learning controller 15 that calculates the compensation amount of the superimposition command based on the position deviation and compensates the superimposition command by adding the calculated compensation amount to the superimposition command. According to such a constitution, the superimposition command of the present embodiment tends to cause a position deviation due to the inclusion of the oscillation command, but followability to the cyclical oscillation command can be improved due to the compensation of the superimposition command.

The present invention is not limited to the above embodiment, and the present invention includes modifications and improvements within the range in which the object of the present invention can be achieved.

EXPLANATION OF REFERENCE NUMERALS

1: Machine tool controller
10: Servo controller
11: Adder
12: Integrator
13: Oscillation command generation unit
14: Adder
15: Learning controller (Learning control unit)
16: Adder (Learning control unit)
17: Position/speed control unit (Control unit)
30: Motor

The invention claimed is:

1. A machine tool controller for a machine tool that performs machining while causing a tool and a workpiece to oscillate relative to each other, the machine tool controller comprising:
   an oscillation command generation unit that calculates an oscillation amplitude and an oscillation frequency from a machining condition and generates an oscillation command; and
   a control unit that causes the tool and the workpiece to oscillate relative to each other based on a superimposition command generated by superimposition of the oscillation command generated by the oscillation command generation unit on a position command or a position deviation, wherein
   the oscillation command generation unit changes at least one of the oscillation amplitude or the oscillation frequency during the machining, after it is determined that the machining has entered a stable state based on a machining position, an elapsed time from a start of cutting feed, or an amount of movement in a machining direction.

2. The machine tool controller according to claim 1, wherein the oscillation command generation unit changes at least one of the oscillation amplitude or the oscillation frequency with a time constant.

3. The machine tool controller according to claim 1, wherein the oscillation command generation unit changes at least one of the oscillation amplitude or the oscillation frequency at a specific oscillation phase.

4. The machine tool controller according to claim 1, wherein the oscillation command generation unit changes at least one of the oscillation amplitude or the oscillation frequency to a smaller value.

5. The machine tool controller according to claim 1, further comprising a learning control unit that calculates a compensation amount of the superimposition command based on the position deviation and compensates the superimposition command by adding the calculated compensation amount to the superimposition command.

6. A machine tool controller for a machine tool that performs machining while causing a tool and a workpiece to oscillate relative to each other, the machine tool controller comprising:
   an oscillation command generation unit that calculates an oscillation amplitude and an oscillation frequency from a machining condition and generates an oscillation command; and
   a control unit that causes the tool and the workpiece to oscillate relative to each other based on a superimposition command generated by superimposition of the oscillation command generated by the oscillation command generation unit on a position command or a position deviation, wherein
   the oscillation command generation unit changes at least one of the oscillation amplitude or the oscillation frequency during the machining, after it is determined that the machining has entered a stable state based on a spindle load, a spindle speed, a spindle speed deviation, a spindle speed fluctuation, a feed shaft load, a feed shaft speed, a feed shaft speed deviation, or a feed shaft speed fluctuation.

7. The machine tool controller according to claim 6, wherein the oscillation command generation unit changes at least one of the oscillation amplitude or the oscillation frequency with a time constant.

8. The machine tool controller according to claim 6, wherein the oscillation command generation unit changes at least one of the oscillation amplitude or the oscillation frequency at a specific oscillation phase.

9. The machine tool controller according to claim 6, wherein the oscillation command generation unit changes at least one of the oscillation amplitude or the oscillation frequency to a smaller value.

10. The machine tool controller according to claim 6, further comprising a learning control unit that calculates a compensation amount of the superimposition command based on the position deviation and compensates the superimposition command by adding the calculated compensation amount to the superimposition command.

* * * * *